United States Patent [19]
King

[11] Patent Number: 5,896,031
[45] Date of Patent: Apr. 20, 1999

[54] QUAD COIL VIBRATION CANCELLING METAL DETECTOR

[75] Inventor: Kevin James King, Little Canada, Minn.

[73] Assignee: Thermo Sentron, Inc., Coon Rapids, Minn.

[21] Appl. No.: 08/819,671

[22] Filed: Mar. 17, 1997

[51] Int. Cl.[6] .......................... G01N 27/72; G01R 33/12
[52] U.S. Cl. .......................................... 324/225; 324/243
[58] Field of Search .................................. 324/243, 326, 324/327, 328, 329, 239, 234, 228, 262, 236, 225

[56] References Cited

U.S. PATENT DOCUMENTS

| | | |
|---|---|---|
| 4,613,815 | 9/1986 | Christel, Jr. ........................ 324/243 |
| 5,572,121 | 11/1996 | Beswick ............................ 324/234 |

*Primary Examiner*—Walter E. Snow
*Attorney, Agent, or Firm*—David George Johnson

[57] ABSTRACT

A metal detector (1) having an oscillator coil (10) which radiates an electromagnetic field in the vicinity of an article to be tested. The field is detected by a primary set of receiver coils (15) which are in close proximity to the oscillator coil (10), as well as by a secondary set of receiver coils (18) located relatively more distant from the oscillator coil. Moving or vibrating metal external to the detector cavity (7) surrounded by the coils (15, 18) will produce a modulated waveform (48) in the primary coils (15) which is similar in period to the modulated waveform (56) produced by the secondary coils (18), while metal passing through the detector cavity (7) will produce a waveform (24) from the primary coils (15) which has a period which differs from the period of the waveform (31) produced by the secondary coils (18). By inverting the secondary coil output signal (42) and adding the inverted signal to the output signal (46) produced by the primary coils (15), a composite signal (68) is produced in which the effect of vibrating or moving metal external to the detector cavity (7) is reduced or eliminated.

14 Claims, 12 Drawing Sheets

QUAD COIL VIBRATION CANCELLING METAL DETECTOR

FIELD OF THE INVENTION

This invention relates generally to the field of metal detectors, and more specifically to metal detectors which must discriminate between the presence of metal within and outside of an article testing aperture.

BACKGROUND OF THE INVENTION

A conventional metal detector includes an oscillator coil which generates a high frequency electromagnetic field within the region of a measuring zone commonly referred to as a detector head. The detector head is formed to include an enclosed volume having an entrance and an exit aperture. The detector head also contains the coil form on which the oscillator coil is wound. An article suspected of containing metal is passed through the detector head aperture by means of, for example, a conveyor. Ideally, all of the electromagnetic field remains within the enclosed volume of the detector head, but in practice some of the field escapes through the aperture. Also residing within the detector head are a pair of receiver coils, symmetrically spaced on either side of the oscillator coil and typically wound on the same coil form. The receiver coils are wired so as to be in series opposition. Through the positioning of the oscillator/receiver coil assembly and by other means well known to those skilled in the art, the signal induced by the oscillator onto each of the receiver coils is of the same magnitude but of opposite polarity. As a result, the net voltage output of the interconnected receiver coils is zero volts.

When metal passes through the detector head aperture, the electromagnetic field within the detector head is disturbed or distorted. The change in the electromagnetic field induces a difference in the signal received by each of the receiver coils. The net voltage sum of the two receiver coils is no longer zero. This perceived change or difference of signal in the receiver coils is then amplified and analyzed to determine if the characteristics of the distorted field are consistent with the presence of metal.

Similarly, the product being tested for the presence of metal also induces a difference in the signal produced by each of the receiver coils. Even though the product is nonmetallic, it will typically have properties such as permeability and conductance that will effect the behavior of an electromagnetic field. This effect itself may be small compared to the change due to metal, but the volume of the product is much greater than that of the metal to be detected. This effect may result in a product signal that is many times greater than the signal from the metal to be detected. Phase sensitive signal analysis is typically used to extract the metal signal from the product signal.

Since the electromagnetic field also protrudes outside of the detector aperture, the presence of metal (and to a lesser extent other materials, such as other products about to be tested) in such exterior regions will also distort the electromagnetic field outside as well as inside the detector head. If the metal or product residing outside of the detector head is in motion, this typically vibrating type of motion creates a time varying change in the electromagnetic field.

Such a change in the electromagnetic field appears as a change or difference in the signal produced by each of the receiver coils and is thus detected as moving metal. In the state of the art metal detector, moving metal outside of the aperture is indistinguishable from metal passing through the aperture. Such a situation can result in the metal detector incorrectly rejecting a metal free article or improperly activating an alarm, either of which results in a loss of production.

A possible solution to the problem of detecting metal outside of the detector head aperture is to decrease the sensitivity of the of the receiver coils, which results in a larger minimum size of detectable metal. Another solution is to track and thereby learn the moving metal characteristics, which may also result in a loss of sensitivity to metal passing through the aperture. A final solution is to attempt to better contain the electromagnetic field entirely within the detector head, which results in a much higher cost of the electronics or the detector head.

An example of such a metal detector is disclosed in U.S. Pat. No. 5,572,121, which addresses the problem of creating a virtual metal free zone by generating primary and secondary electromagnetic fields in opposition to each other. The interaction of the secondary opposing field with the primary field limits the distance or range that the primary field extends from the detector head and creates a barrier to further extension of the primary field. This prevents the primary field from being influenced by the presence of metal beyond that finite distance.

The aforementioned technique is not entirely satisfactory. In order to contain the primary field, a field of the opposite polarity is generated which itself extends outside of the detector head. The new field is also sensed by the detector coils as was the primary field, only with the opposite polarity. Shaping the field using metal forms and shapes is also relatively ineffective because the resonant frequency of the forms is so high when compared to the relatively long wavelengths associated with the oscillator frequency.

SUMMARY OF THE INVENTION

The present invention is a metal detector housed within a metal or conductive case, typically stainless steel or aluminum, having an opening which admits the article to be tested. A detector head having an oscillator coil and a first set of two symmetrically spaced receiver coils is mounted within the case. A second, additional set of symmetrically spaced receiver coils is also present, but at a different and greater distance from the oscillator coil. Both sets of receiver coils are wired in series opposition.

When metal or product passes through the aperture, the resultant signal produced from the second, outer set of receiver coils is of a smaller amplitude but the same phase with respect to the oscillator signal as the signal produced by the first, inner set of receiver coils. The second coil set signal peaks are also skewed in time with respect to the first coil set signal peaks, due to the offset of the coil set positions.

The signal presented by metal moving outside of the detector head will be different from metal passing through the aperture in several respects. First, the signal from the second, outer receiver coils will have a different amplitude than the signal produced by the first, inner set of receiver coils. The signal peaks created by moving metal outside of the head will also appear simultaneously on both coil sets and not be skewed or offset in time. Finally, the metal or product passing over the internal coil sets will give a 180 degree phase reversal as the metal or product passes through the center of the head. Conversely, the externally moving metal does not change position relative to the two receiver coil sets, so the phase does not undergo a 180 degree phase reversal.

BRIEF DESCRIPTION OF THE DRAWINGS

FIG. 17b is a graph depicting the absolute value or rectification of the waveform shown in FIG. 17a.

DETAILED DESCRIPTION OF THE PREFERRED EMBODIMENTS

Referring to FIGS. 1-4, a metal detector constructed according to the principles of present invention is shown generally at 1. The metal detector 1 includes a metal or conductive cabinet 2, typically stainless steel or aluminum, that is supported by shock absorbing feet 3 and 4. The cabinet is formed to include a generally rectangular first sidewall 5. The sidewall 5 includes an opening or first aperture 6 which permits access to an interior volume of cavity 7. A second sidewall 8 also includes a coaxially aligned second aperture 9, such that an article (not shown) may enter the cavity 7 through first aperture 6 and exit cavity 7 through second aperture 9. In an alternate embodiment (not shown) the aperture may have a circular shape, and the entire cabinet may also be generally circular or toroidal in configuration.

Figure 1:
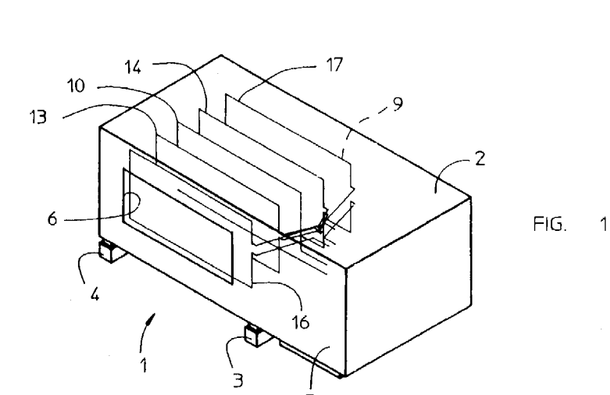
FIG. 1 is a perspective view of a metal detector constructed according to the principles of the present invention.
Figure 2:
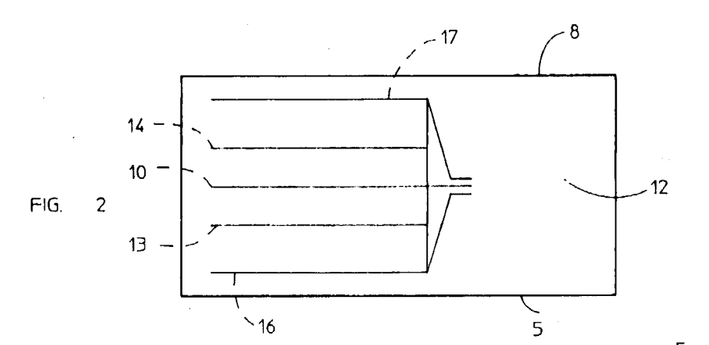
FIG. 2 is a plan view of the metal detector depicted in FIG. 1.
Figure 3:
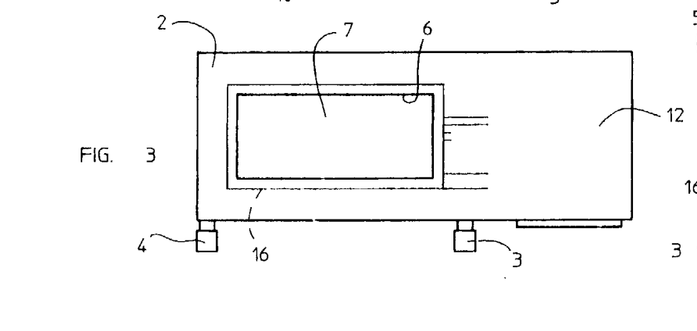
FIG. 3 is a side elevational view of the metal detector depicted in FIG. 1.
Figure 4:
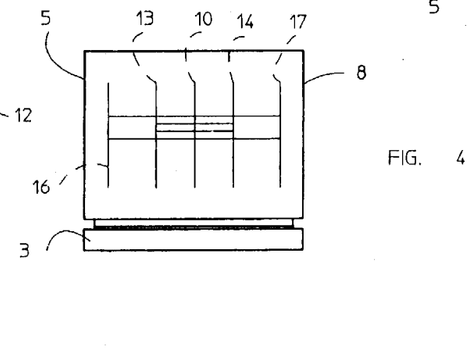
FIG. 4 is a front elevational view of the metal detector depicted in FIG. 1.
Figure 5:
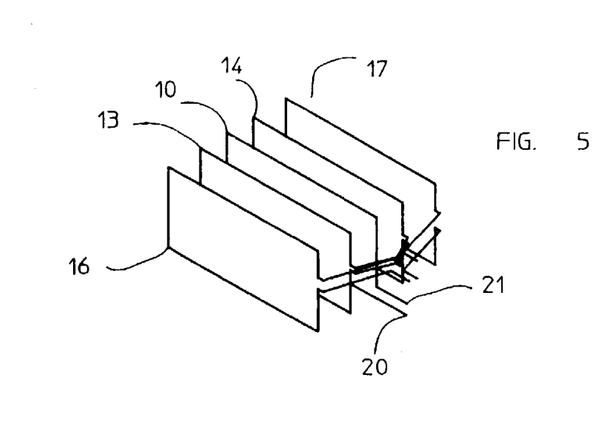
FIG. 5 is a perspective view of the coil arrangement utilized in the metal detector depicted in FIG. 1.
Figure 6:
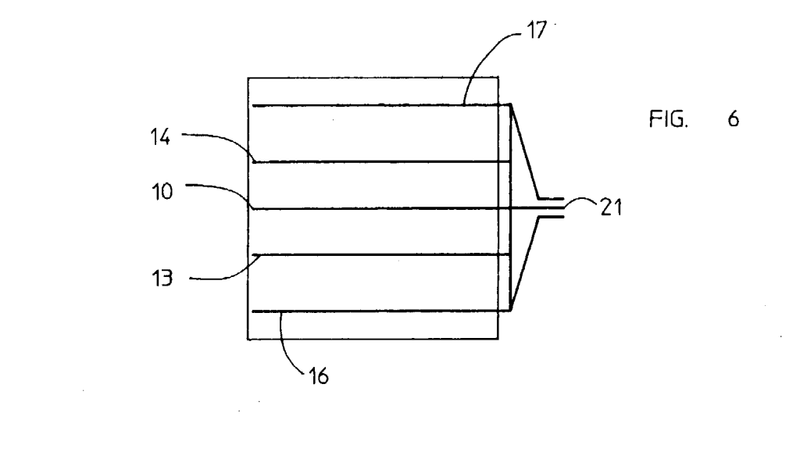
FIG. 6 is a plan view of the coil arrangement depicted in FIG. 5.
Figure 7:
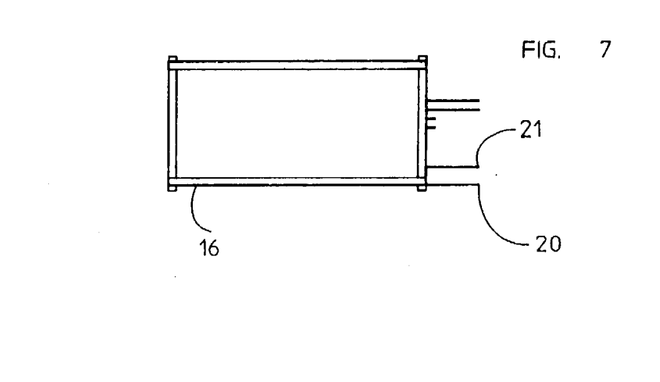
FIG. 7 is a side elevational view of the coil arrangement depicted in FIG. 5.
Figure 8:
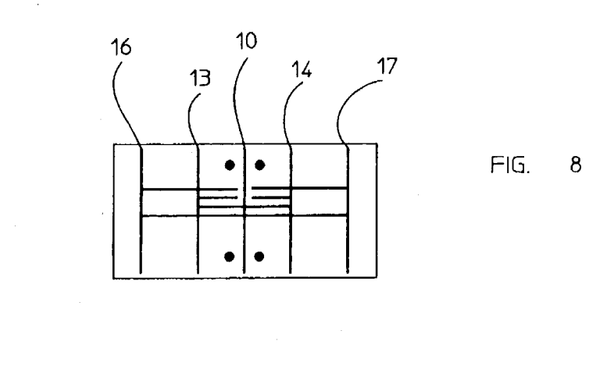
FIG. 8 is a front elevational view of the coil arrangement depicted in FIG. 5.
Figure 9:
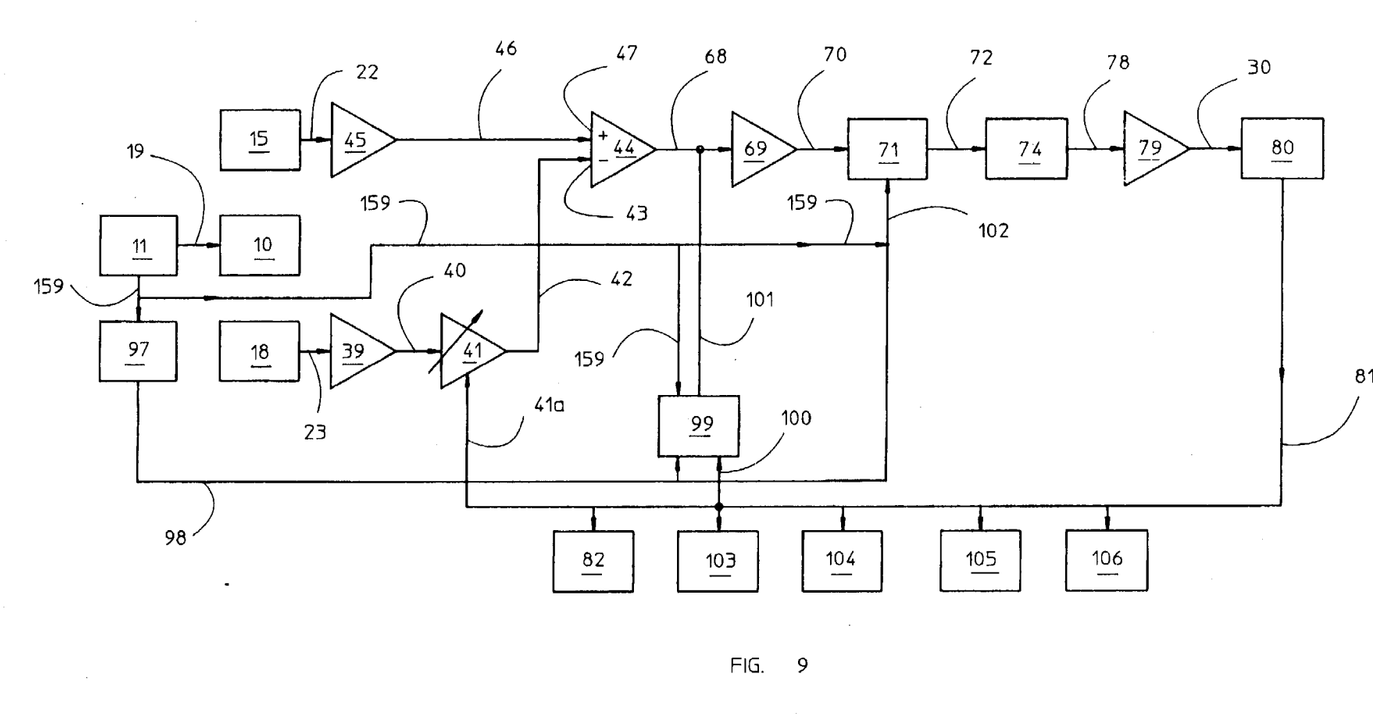
FIG. 9 is a block diagram of a first preferred embodiment of the metal detector depicted in FIG. 1.
Figure 10:
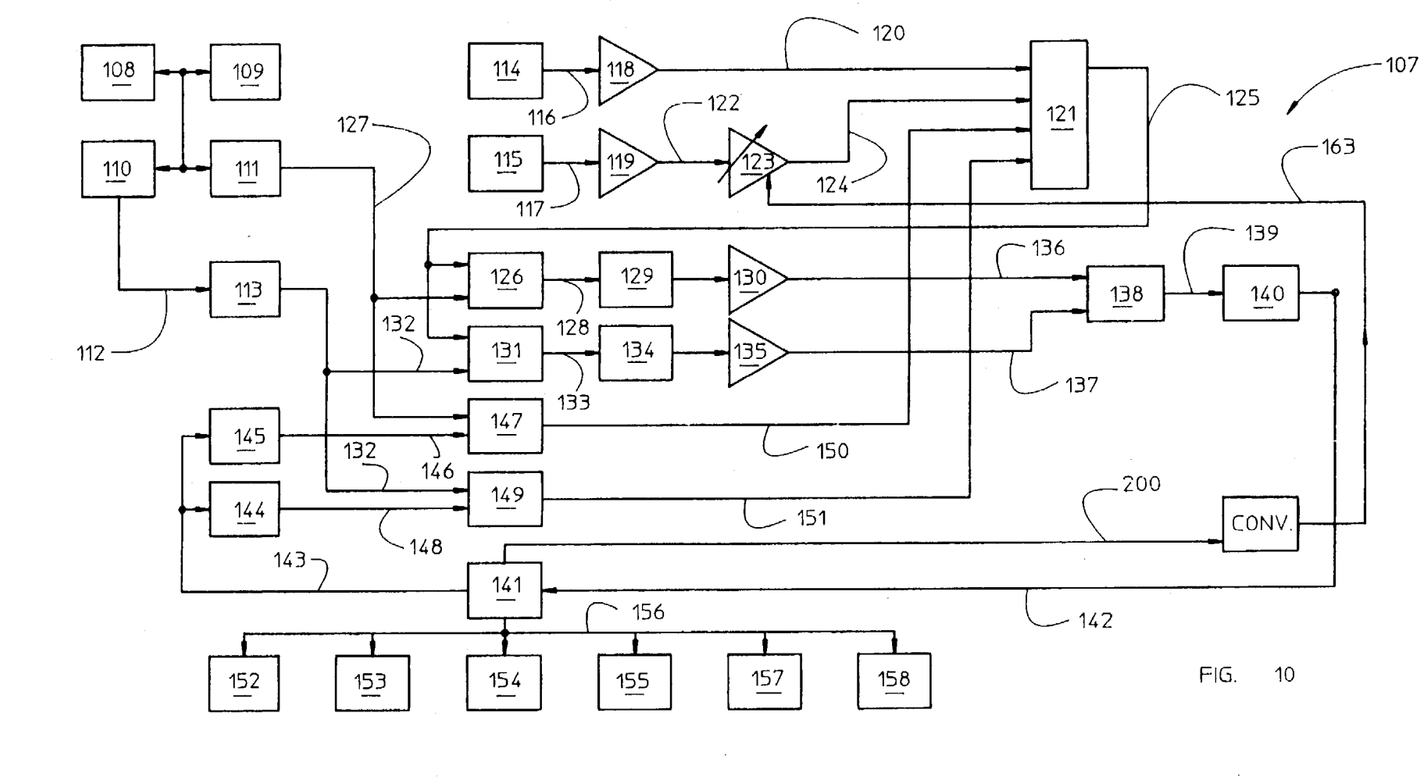
FIG. 10 is a block diagram of a second preferred embodiment of the metal detector depicted in FIG. 1.

An oscillator coil 10 resides within cabinet 2. The oscillator coil 10 surrounds and substantially bifurcates the cavity 7. As seen in FIGS. 9 and 10, the oscillator coil 10 is excited or driven by the oscillator or transmitter 11, which is housed within the region 12 of cabinet 2. Symmetrically spaced on opposite sides of oscillator coil 10 is a left inner receiving coil 13 and a right inner receiving coil 14, which together are considered to be the primary receiver coil assembly 15. Coils 13 and 14 are connected to each other in series opposition. Also spaced symmetrically about the oscillator coil 10 is a left outer receiver coil 16 and a right outer receiver coil 17, which together form the secondary receiver coils 18. Coils 16 and 17 are connected to each other in series opposition.

The oscillator 11 produces a low frequency electromagnetic signal typically in the range of thirty kilohertz to two megahertz. The oscillator 11 is coupled to the oscillator coil 10 along signal path 19, which is accomplished through leads 20 and 21. The oscillator coil 10 acts as an antenna, radiating the signal produced by oscillator 11 and producing an electromagnetic field within and somewhat beyond cavity 7. The receiver coils 15 and 18 reside within the electromagnetic field produced by oscillator coil 10, the coils 15 and 18 producing a signal which travels along signal paths 22 and 23, respectively.

In the absence of metal, and due to their series opposition interconnection, the signal received by inner coil 13 from oscillator coil 10 is of the same magnitude but opposite polarity as the signal received by inner coil 14, thereby producing a resultant signal 22 of zero volts. When metal is present, it distorts the symmetry of the electromagnetic field produced by oscillator coil 10, thereby causing signals of different magnitude and phase to appear on coils 13 and 14. This imbalance produces a signal 22 having a magnitude that is greater than zero volts.

The signal strength of the signal 22 produced by the receiver coils 13 and 14 is a function of the size, shape and composition of the detector head, the absolute strength of the electromagnetic field produced by oscillator coil 10, the size of the metal object (not shown), the composition of the metal object, the distance between the metal object and the receiver coils, and the distance the metal object is from the oscillator coil. The closer the metal object is to the oscillator coil, the greater its effectiveness in distorting the electromagnetic field transmitted by oscillator coil 10. A relatively greater field distortion produces a relatively greater unbalance in the signal received by primary coil assembly 15 and hence the magnitude of signal 22 also increases. Similarly, the closer the metal object is to either receiver coil 13 or 14, the greater the imbalance in the amount of signal received by each coil, resulting in a relatively greater magnitude of signal 22. Thus, the greater the distance between the metal object and any of the coils, the less the magnitude of the signal 22. This principle also holds true for the outer receiver coils 16 and 17. Typically, the primary receiver coils 13 and 14 are arranged and spaced in such a manner so as to maximize the magnitude of the received signal 22 when the metal object is passed through the center of the aperture.

The oscillator 10 operates at a discrete, continuous wave radio frequency typically in the range of 0.03 to 2.00 megahertz. The emitted signal is received by the adjacent receiver coils 13, 14, 16 and 17. Since the coils 13 and 14 are wired in series opposition, and coils 16 and 17 are wired in series opposition, there is no resultant output signal 22 or 23 when metal (or other electromagnetic field distorting medium) is absent from the vicinity of the radiated electromagnetic field.

However, when a moving metal article is brought into proximity with the electromagnetic field, the electromagnetic field effectively undergoes amplitude and phase modulation, that is, the magnitude of the signal appearing at any point in the radiated electromagnetic field varies with respect to time. The modulation frequency is typically in the range of 0.1 to 100 hertz. The actual frequency is dependent on the speed of the metal (or product) passing through the aperture, the coil separation, the size of the metal, and the location of the material or metal in relationship to the coils while in the aperture.

Figure 11:
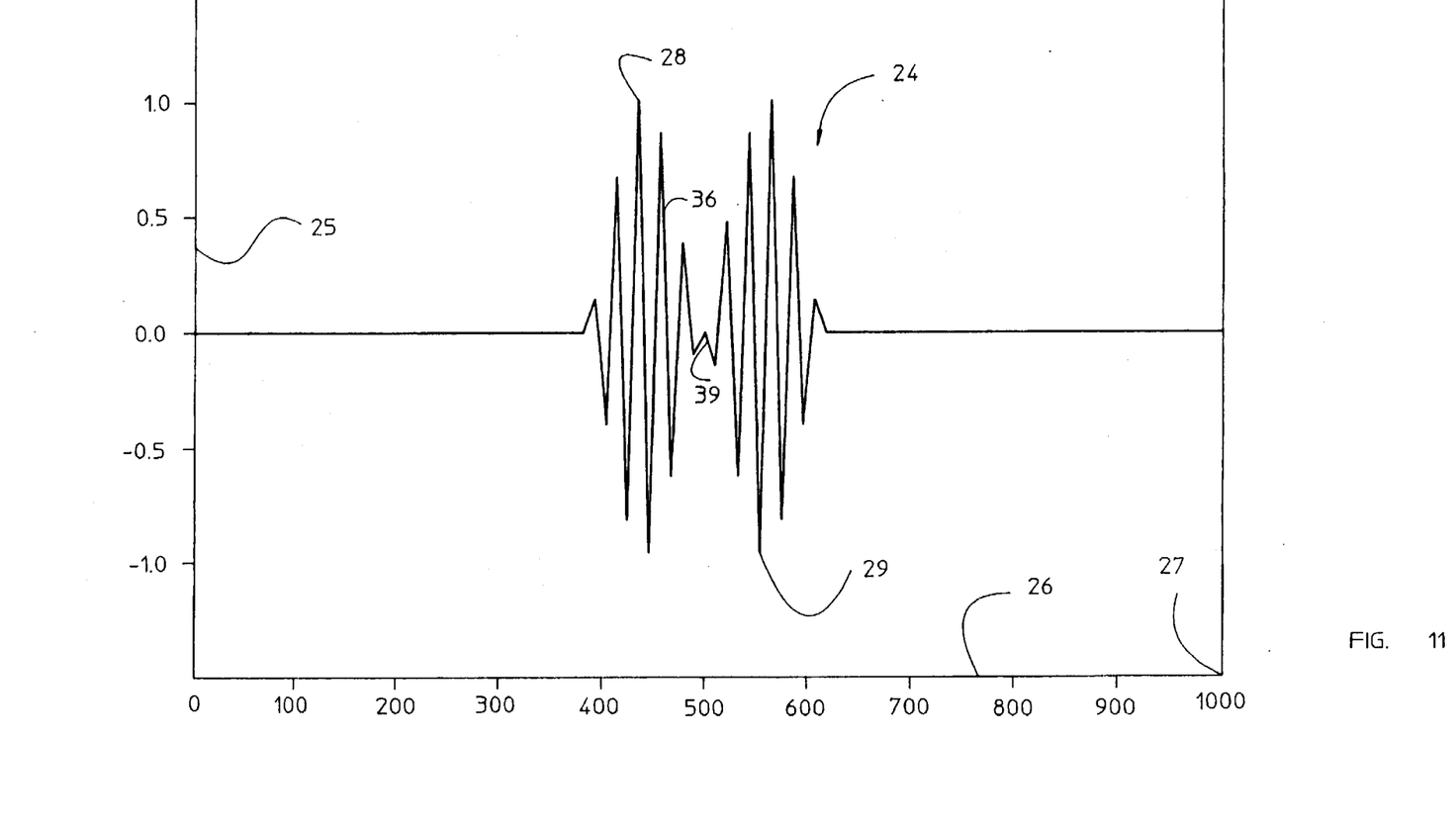
FIG. 11 is a graph depicting the waveform from the primary receive coils produced when metal is passed through the metal detector depicted in FIG. 1.

The signal received by coil 13, for example, will have an amplitude and an amplitude modulation frequency that is dependent on the metal (or product being tested) characteristics as well as the velocity of the metal as it passes through the detector head cavity 7. Referring also to FIG. 11, a waveform 24 is depicted that is typical of the output from primary receiver coils 13 and 14 when metal passes through the detector cavity 7. The axis 25 represents the magnitude or amplitude of the signal 22 in units such as volts, while axis 26 represents the elapsed time, with point 27 (1000) representing one second.

The signals 160 and 161 represent the period of time when no metal or product are in the detector cavity. The resultant output during this period of time is zero due to the cancellation of the electromagnetic field by the opposing receiver coils. As metal enters the location in the detector cavity over the first coil the signal 24 has a first amplitude modulation envelope peak 28 which corresponds to the metal object passing by coil 13. This is followed by a second amplitude modulation envelope peak 29 which corresponds to the metal object passing by coil 14. The time difference between the envelope peaks 28 and 29 along axis 26 indicates the absolute frequency of the amplitude modulation, which is dependent on the parameters mentioned previously. The closer the coils 13 and 14 are to the center of the cavity 7, and hence to the oscillator coil 10, the higher the frequency of the amplitude modulation due to the shorter period of time needed for passage of the object over the coils 13 and 14.

Also, each item passing through the cavity 7, whether metal or nonmetal, introduces a unique phase characteristic to the received carrier signal 24 which is dependent on the physical properties of the item itself. This effect of this phase characteristic is to introduce a delay or lag in the phase of signal 24 with respect to the oscillator signal 19. If the item under test tends to be of a known, repeatable type, such as a particular food item, its unique phase altering characteristic can be anticipated and processed by means well known in the art to eliminate its effect in the final output signal, such as signal 30 (FIG. 9), or even to manipulate the signal digitally to attain the same effect.

When a metal detector 1 is used in the food processing industry, the detector is typically placed in a location which is a part of the existing food processing line. Due to constraints in processing the food items, there is often little discretion in choosing where the detector 1 will reside. This results in the detector 1 often being placed in close proximity to other metal objects, such as conduits, casings, cabinets and similar metal fixtures. Such equipment, such as pumps and conveyors, can vibrate or otherwise move with respect to the fixed position of the metal detector 1. The magnitude of the effect of such equipment on the metal detector 1 is dependent on the size of the detector aperture 6, the size of the detector cavity 7, the size and location of the surrounding equipment, its material type and the magnitude and frequency of any vibration or movement. In many real world situations, the magnitude of such external interference is sufficient to cause a state of the art metal detector to falsely indicate the presence of metal in the item under test.

Figure 12:
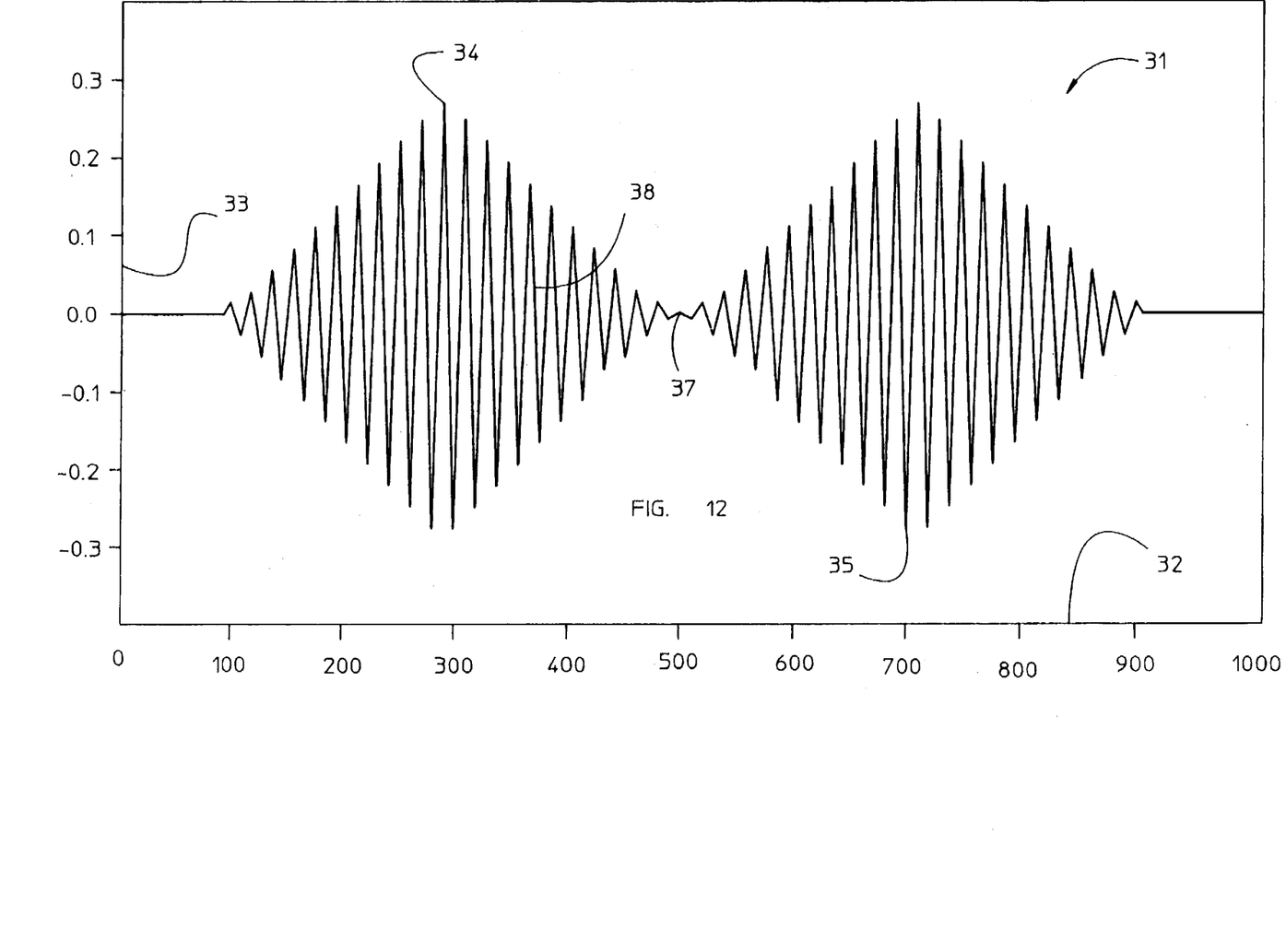
FIG. 12 is a graph depicting the waveform from the secondary receive coils produced when metal is passed through the metal detector depicted in FIG. 1.

Referring also to FIG. 12, the effect of the secondary receiving coils 16 and 17 can be appreciated. The signal 31 assumes that an identical metal article moving at the identical velocity depicted in FIG. 11 has passed through detector cavity 7. The axis 32 is the time scale identical to that depicted in FIG. 11. The axis 33 depicts the magnitude of the signal 31. Since the secondary receiver coils 16 and 17 are physically farther from the signal radiating oscillator coil 10 than primary coils 13 and 14, the magnitude of the amplitude modulation envelope peaks 34 and 35 is correspondingly less than the envelope peaks 28 and 29. In particular, whereas primary coil envelope peak 28 is approximately 1.0 volt, the corresponding secondary coil envelope peak 34 is approximately 0.25 volt. In general, since the secondary receiver coils 16 and 17 are farther from the oscillator coil 10 and nearer to the apertures 6 and 9, the secondary coils 16 and 17 will have a signal amplitude from metal passing through the aperture that is less than the signal amplitude from the primary coils resulting from metal passage.

The secondary signal 31 is similar to the primary signal 24 in many respects. The signal 31 is of the same high frequency radio wave, as indicated, for example, by the period of waveform 38 (secondary coil) as compared to the period of waveform 36 (primary coil). Similarly, the signal 31 is amplitude modulated, and the phase of the signal is affected by the characteristics of the metal or product under test. However, due to the greater physical spacing between the secondary coils 13 and 14, the wavelength of the amplitude modulated signal 31 is greater than signal 24, and the frequency of the amplitude modulation is therefore lower.

One should also note that since all of the coils are physically separated, the envelope peaks 28, 29, 34 and 35 occur in a predictable, sequential fashion. For example, if a metal object passes through aperture 6 and exits through aperture 9, the secondary envelope peak 34 will occur first (at t=275 msec, for example), the larger primary envelope peak 28 will occur next (at t=440 msec, for example), the second primary peak 29 will be the third event to occur (at t=540 msec, for example) and finally the smaller secondary envelope peak 35 will occur (at t=700 msec, for example).

The signal produced due to metal moving outside of the detector cavity 7 will produce a signal having significantly different characteristics from a signal resulting from metal that is passing through the detector cavity 7. The two signal will also be similar in some respects. Both the primary receiver coil assembly 15 and the secondary receiver coil assembly 18 will detect the amplitude modulated disturbance in the radiated electromagnetic field at the same time.

However, the amplitude modulated signal from the primary and secondary coil signals will be correlated with respect to time, that is, the positive peak of the secondary coil will occur at the same time as the positive peak of the primary coil. As just discussed, a signal produced by metal moving through the cavity will produce envelopes from the secondary and primary coils that are offset with respect to time. Further, the magnitude of the envelope peak from the externally vibrating metal from the secondary coils will not necessarily be smaller than the envelope peak produced by the primary coils. This information can be used to utilized to minimize the interference to the metal detection process caused by metal that is moving or vibrating outside of the region of the detector cavity 7.

The signal processing steps needed to realize this advantage will now be discussed. The resultant signal 23 produced by secondary receiver coil assembly 18 is first amplified by means of constant gain amplifier 39. The output signal 40 is fed to a variable gain amplifier 41 which produces an output signal 42 that is fed to the inverting input 43 of difference amplifier 44. The gain of the variable gain amplifier 41 is set by the control signal 41a from the CPU 82 such that the signal output from the variable gain amplifier 41 produced from the external vibrating metal has the same peak to peak amplitude as the amplified signal 46 from the primary coils 15. In an alternate embodiment, the variable gain amplifier can be placed instead on the ouput 46 of the primary coils 15. The gain of the variable gain amplifier 41 would then be adjusted so that primary coil output 46 would be substantially equal to the peak to peak signal produced by the external vibrating metal.

The output signal 22 produced by primary receiver coil assembly 15 is also amplified by a fixed gain amplifier 45 which produces an output signal 46. The output signal 46 is fed to the noninverting input 47 of difference amplifier 44, where it is added to inverted secondary coil signal 43. Since the signal produced by the secondary coil assembly 18 is substantially identical (except for magnitude) to the signal produced by the primary coil assembly 15 only to the extent that both assemblies 15 and 18 have sensed metal that is outside of cavity 7, the variable gain amplifier 41 is used to adjust the amount of inverted signal 42 that is needed to cancel the corresponding signal component appearing in the in the primary coil signal 46.

Figure 13:
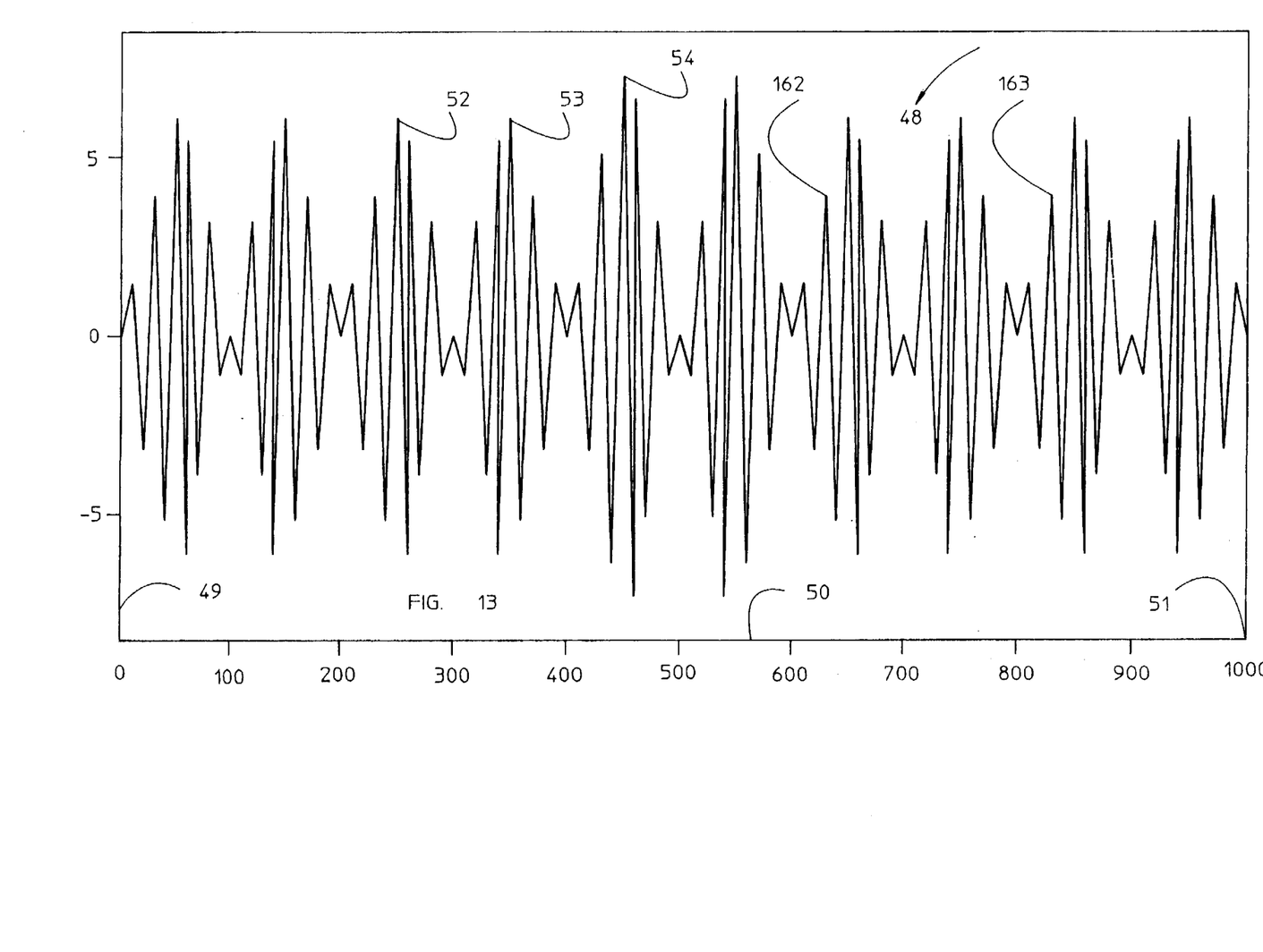
FIG. 13 is a graph depicting the waveform produced by externally vibrating metal and metal passing through the aperture as sensed by the primary coils in the metal detector of FIG. 1.

Referring to FIG. 13, the waveform 48 is displayed which represents the primary signal 46 when both internal and external metal objects are present. The axis 49 represents the magnitude of the signal while the axis 50 represents the elapsed time, with point 1000 being equal to one second. The amplitude modulation of the signal at points 52 and 53, for example, is due to the effect of vibrating metal that is external to the detector cavity 7. The waveform peak 54 is caused by the presence of metal moving through the detector cavity 7 further modulating the signal. The signal peak 54 attributable to metal passing through the head may often not be noticeable when plotted graphially prior to additional signal processing. The effect of the vibrating metal modulation is to obscure the the signal which produces peak 54. The peak may in some instances coincide with a null in the vibration modulation, resulting in an instantaneous peak 162, for example, which is not perceived to be measurably greater than the modulation induced peak 163. Due to possible variations in the vibration source, the signal caused by the external vibrating metal can vary enough to hide the variation caused by the passage of metal through the aperture.

Figure 14:
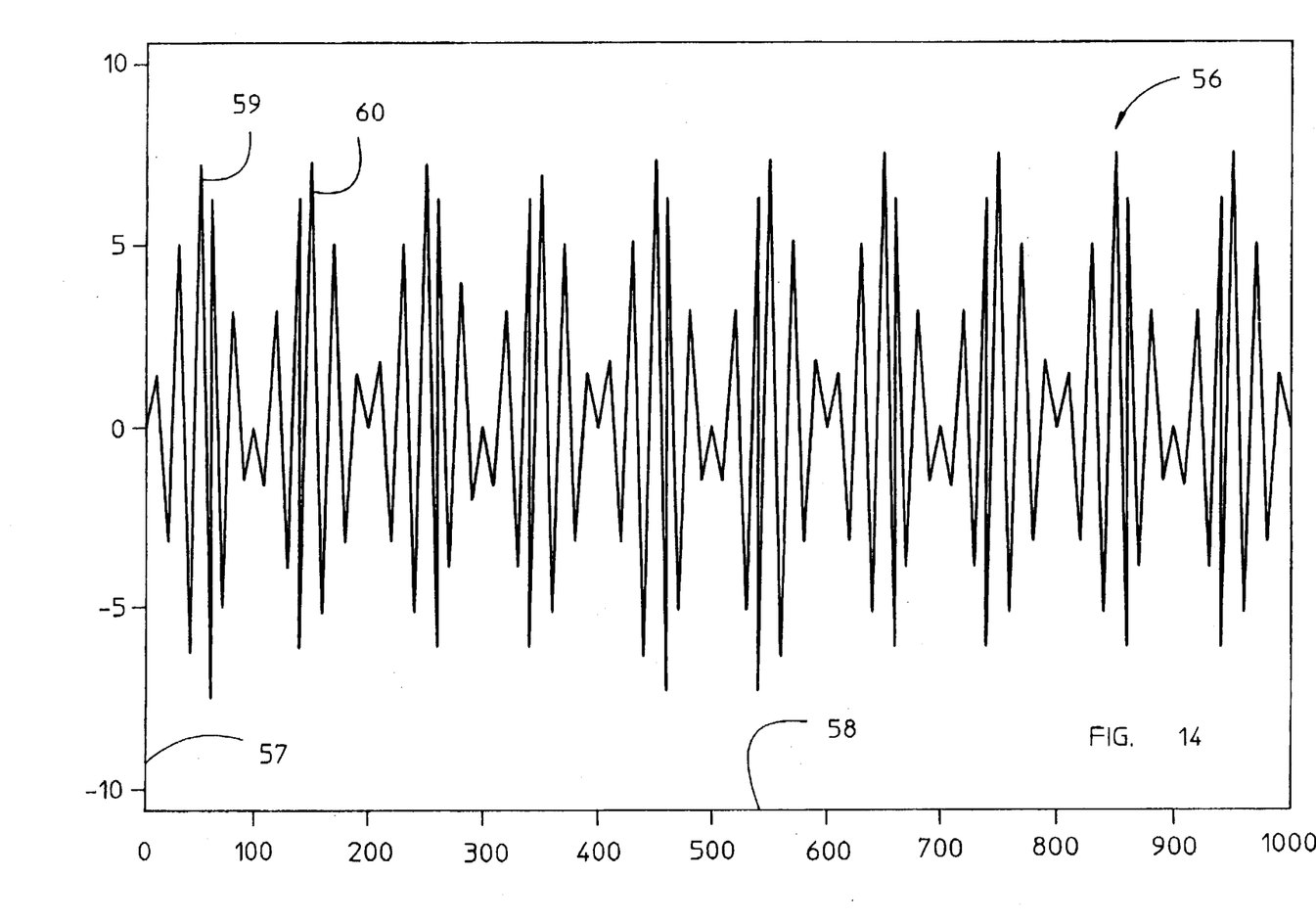
FIG. 14 is a graph depicting the waveform produced by externally vibrating metal and metal passing through the aperture as sensed by the secondary coils of the metal detector depicted in FIG. 1.
Figure 15:
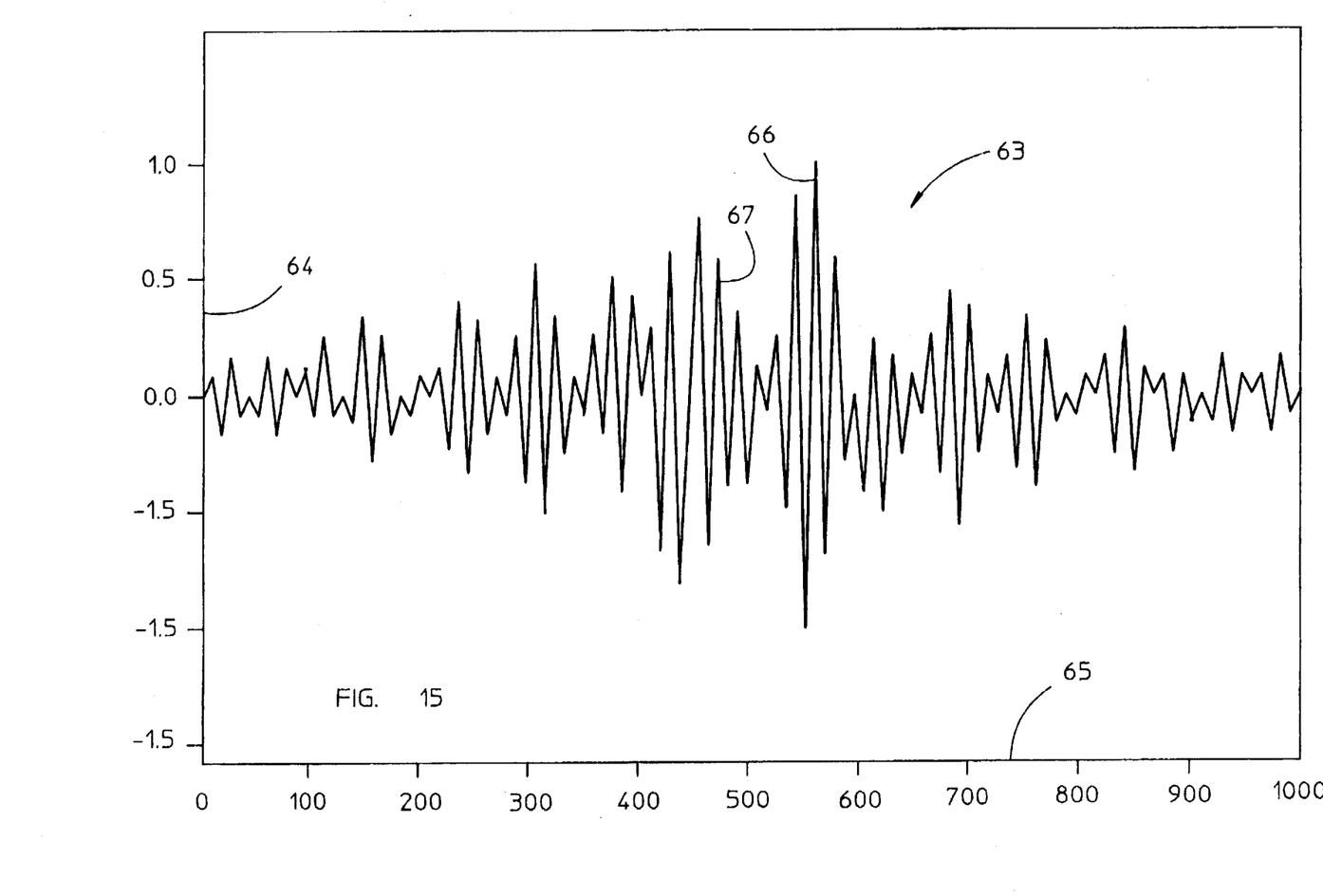
FIG. 15 is a graph depicting a composite signal produced by scaling and adding the waveform produced by the primary coils to the waveform produced by the secondary coils of the metal detector shown in FIG. 1.

Depicted in FIG. 14 is the waveform 56 which corresponds to the secondary signal 42 that is produced when both external and internal metal objects are present. The axis 57 represents the magnitude of the signal 56 while the axis 58 represents the elapsed time. The amplitude modulation of the signal 56 at points 59 and 60, for example, is due primarily to the effect of metal that is external to the detector cavity 7. When the waveform 48 and the inverse of the scaled waveform 56 are added together, such as would occur within difference amplifier 44, a composite waveform 63 is produced as shown in FIG. 15, where axis 64 represents signal magnitude and axis 65 represents the elapsed time. The feedback of secondary coil signal 42 has the effect of greatly attenuating the waveform components 52, 53, 59 and 60 which are attributable to the presence of external moving metal. The waveform components 66 and 67 are attributable to the presence of metal moving through the detector cavity 7 and are more readily identifiable and thereby simplifies subsequent signal processing steps that seek to detect any metal appearing within the detector cavity 7.

Figure 16:
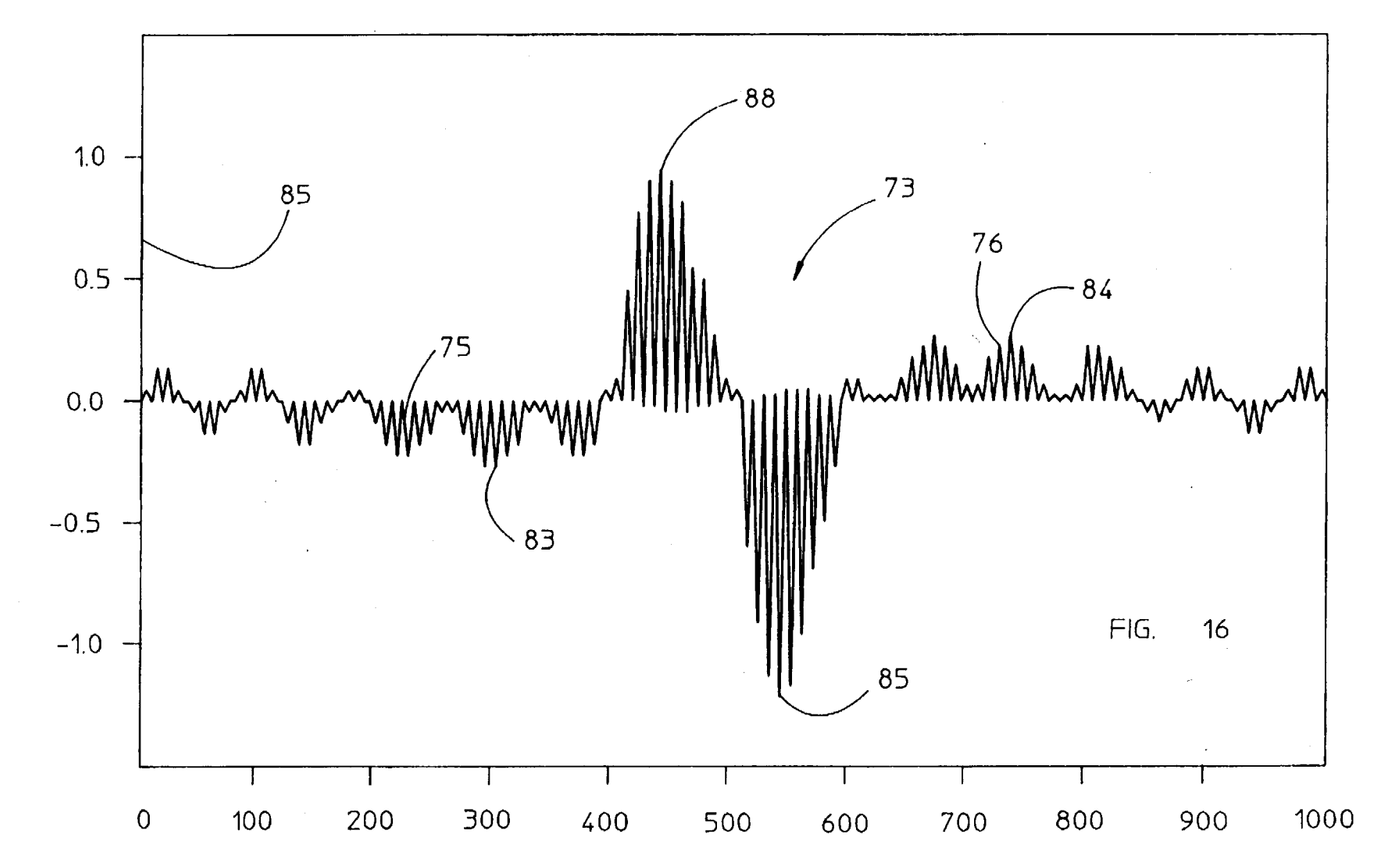
FIG. 16 is a graph depicting the synchronously detected signal of the waveform shown in FIG. 15.
Figure 17A:
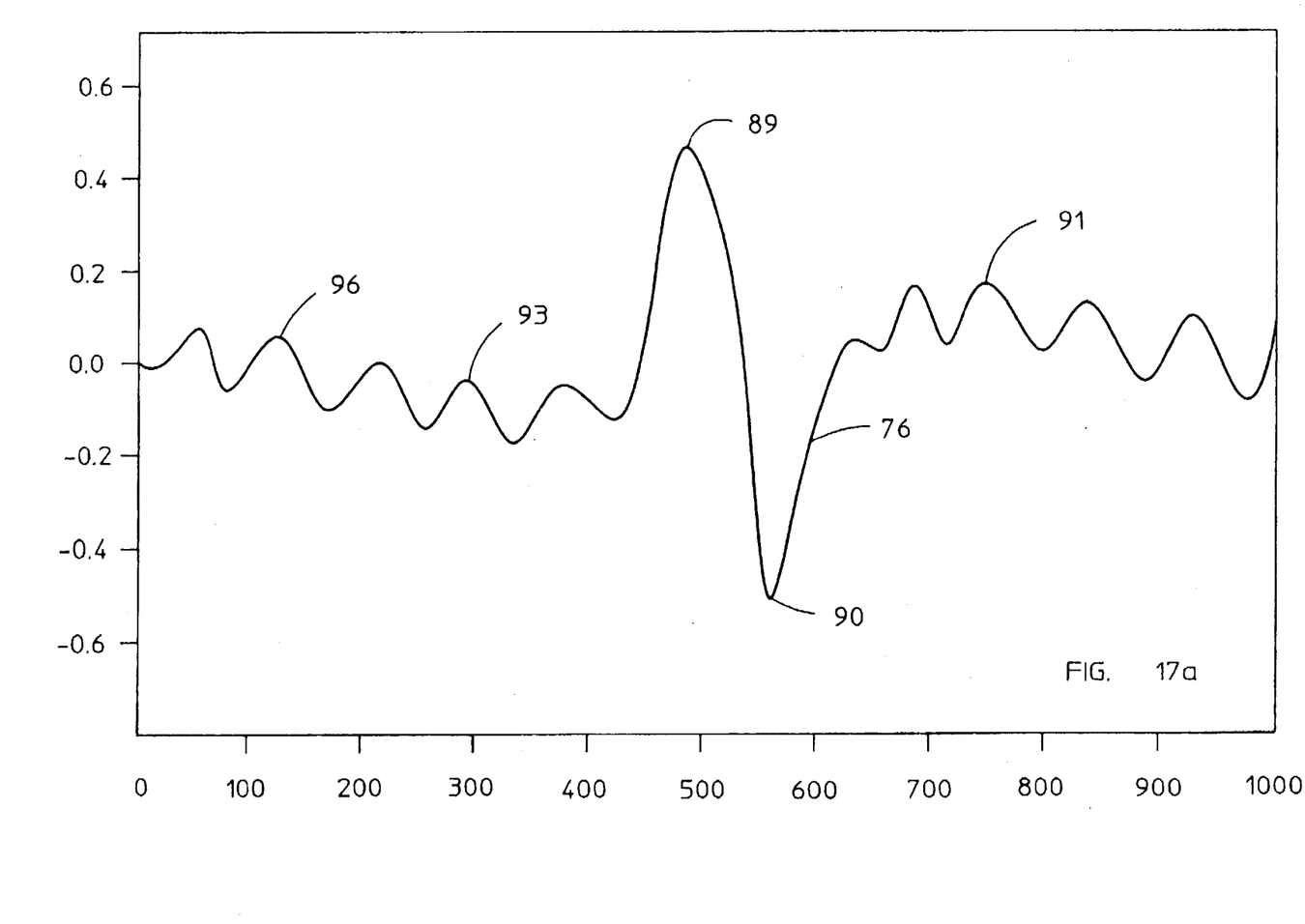
FIG. 17a is a graph depicting the filtering of the waveform shown in FIG. 16.

As seen in FIG. 9, such signal processing steps include the amplification of difference amplifier output signal 68 by amplifier 69. The amplified output signal 70 serves as the input to quadrature detector 71 which produced a synchronously detected output signal 72. Synchronous detection is frequently used to remove other random noise components. Referring to FIG. 16, the output signal 72 may have the appearance of waveform 73. The appearance of the waveform may vary, depending on the phase relationship between the signal input and the reference input to the quadrature detector. The high frequency oscillator waveform components 75 are still present along with the low frequency amplitude modulated envelope 88 and 85. The amplified output signal 72 is fed to low pass filter 74, where the high frequency component 75 is removed, leaving only the low frequency component 76, as shown in FIG. 17a.

Figure 17B:
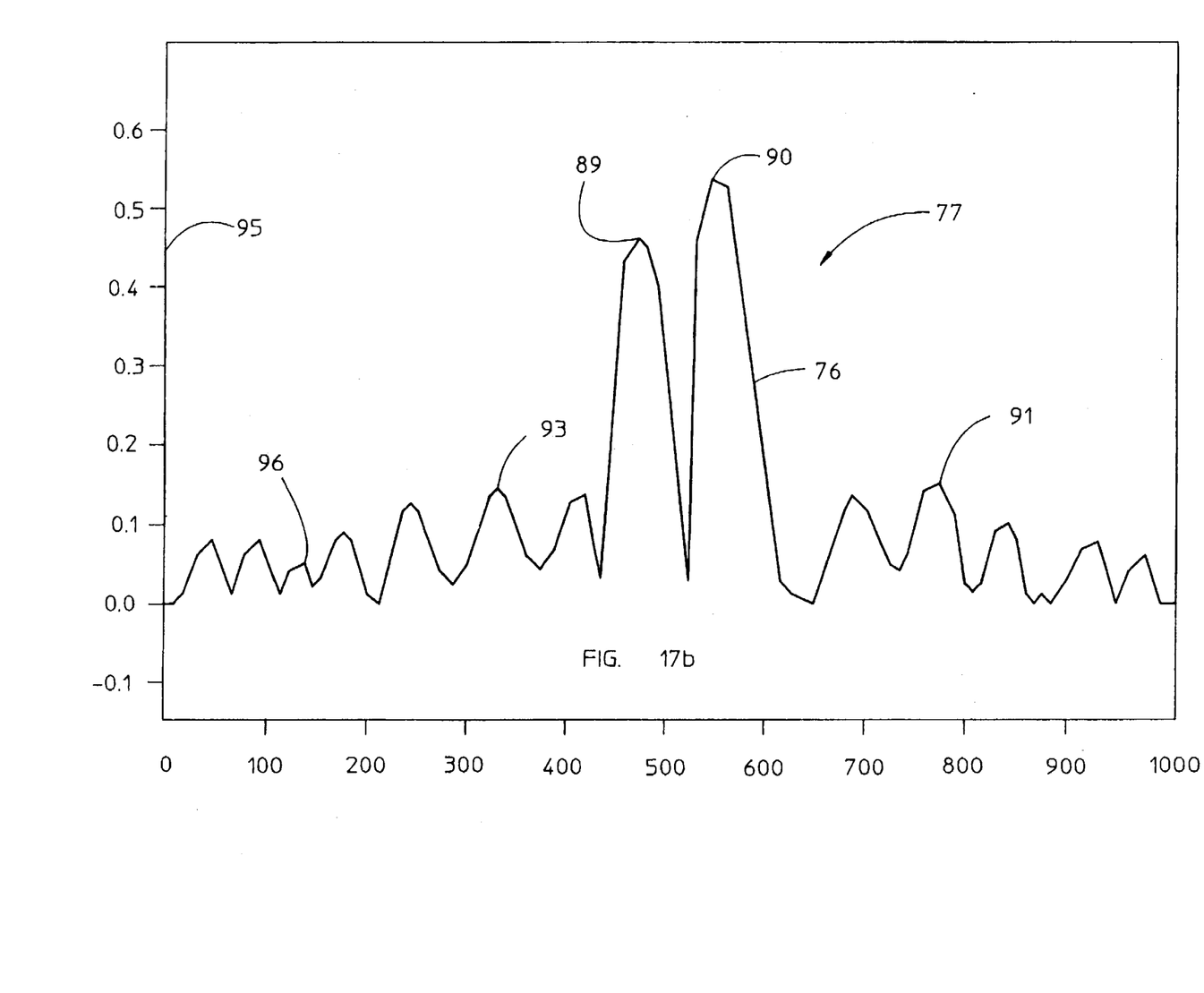

The output signal 30 is the input to analog to digital converter 80, which produces a digital output signal 81 which is sent to central processing unit 82 for analysis. Assuming the passage of metal through cavity 7, the CPU 82 will receive a digital version of waveform 76. One intial method of analysis may convert the now digitized waveform 76 to an absolute value represented by waveform 77. In this graphical representation of the signal the residual vibrating metal signal is reduced to much lesser peaks 91, 93 and 96. The amount of residual signal is determined by a number of factors such as the accuracy of the amplifier scaling for signal elimination, DC offsets of amplifiers and how far the external metal signal moves. The larger the movement the less cancellation is possible due to the trigonometry of the metal and coil distances. The metal moving through the aperture produces signal peak 89 as the metal passes over the first primary coil and signal peak 90 as the metal passes over the second primary coil.

Using the magnitude scale 95 shown in FIG. 17, the metal detection threshold can be set to some value above approximately 0.3 volts, which will permit the sensitive detection of metal within detector cavity 7 while ignoring the effects of the externally moving metal. Other detection methods may be used to further enhance the metal signal such as a zero crossing method using the signal 89 where the metal signal passes from a large peak, either positive or negative, through a zero voltage level at the center of the aperture, to a peak of the opposite polarity of the first peak.

Additional circuit features include a phase shifting circuit 97 which receives oscillator signal 159 along signal path 159 and shifts the oscillator signal by some known amount, typically 90°. This phase shifted signal and the original unshifted signal 98 are fed to a balance circuit 99 which also receives as an input 100 the detector output signal 81. The balance circuit feeds back a balancing signal 101 to amplifier 69 having sufficient magnitude of phase shifted and unshifted signals 98 and 159 to maintain circuit balance in the absence of any metal, and thereby compensates for any long term imbalance caused by component aging, thermal affects, and minor physical asymmetries in the detector 1. The phase shifted and unshifted signal 98 and 159 also serves as inputs 102 to quadrature detector circuits 71 to serve as reference signals in determining mixed composite signal 70 characteristics.

Information sent to and received from the CPU 82 is viewed on display 103, and manual inputs to the CPU 82 are made via a keyboard 104. Additional control of the metal detector 1 can be exercised automatically through conveyor velocity or other interlocks 105 based on events occurring at other points in the food processing line. Finally, an alarm or other reject signalling device 106 can be activated by CPU 82 in response to the presence of metal within the detector cavity 7.

A second embodiment of the present invention is depicted in FIG. 10, where a metal detector 107 is depicted which includes a high frequency oscillator 108 feeding an oscillator coil 109, a phase shifting circuit 110 and a reference signal amplifier/attenuator 111. The phase shifted output signal 112 is fed to a signal amplifier/attenuator 113.

The electromagnetic field generated by the oscillator coil 109 is received by the primary coils 114 and the secondary coils 115, which are physically arranged with respect to each other in the manner already described for metal detector 1. Each of the receiver coil outputs 116 and 117 are amplified by fixed gain amplifiers 118 and 119, respectively. The output signal 120 from primary amplifier 118 is fed directly to mixer 121, while the output signal 122 from secondary amplifier 119 is first sent through variable gain amplifier 123 for the purpose of adjusting the magnitude of signal 122 to be properly scaled with respect to primary signal 120. The output signal 124 from the variable gain amplifier 123 is also sent as an input to mixer 121.

The primary signal 120 is added to secondary signal 124 by mixer 121, producing composite signal 125 which serves as an input to signal demodulator 126. The output 127 of reference signal amplifier 111 also serves as an input to signal demodulator 126, which performs a synchronous detection using the referene signals 127 and the composite signal 125 and produces an output signal 128 which is fed to a first low pass filter 129 and then further amplified by a first amplifier 130.

The composite mixer output signal 125 also serves as the input to the phase shifted signal demodulator 131, which has as a second input the output signal 132 produced by phase shifted amplifier 113. The demodulated output signal 133 is fed to a second low pass filter 134 which feeds a second amplifier 135. The first (in phase) amplifier output signal 136 and the second (phase shifted) amplifier output signal 137 both serve as inputs to multiplexor 138, which switches between signals 136 and 137. The output signal 139 is digitized by analog to digital converter 140. The output signal 142 from A/D converter 140 is sent to the CPU 141 where it is properly scaled for the vibration signal cancellation. The CPU 141 adjusts Digital to Analog converter 55 via digital control lines 200, the output 163 of converter 55 being the input signal to variable gain amplifier 123. The gain of amplifier 123 is adjusted to obtain maximum cancellation of the external vibration signal at mixer 121.

A central processing unit 141 also receives the output signal 142 from A/D converter 140, signal 142 representing the signal from the metal or product passing through the aperture, residual signal from externally vibrating metal, and the amount of imbalance in the coils 114 and 115. Based on the characteristics of signal 142, CPU 141 generates a digital correction balance signal 143 which is converted to analog form by first and second D/A converters 145 and 144, respectively. The output 146 of first D/A converter 145 controls the gain of reference signal analog multiplier 147, which has as its second input the reference (unshifted) signal 127. The analog output signal 148 of second D/A converter 144 is sent to phase shifted analog multiplier 149, which has as its input the phase shifted oscillator signal 132.

The reference analog multiplier output 150 and the phase shifted analog multiplier output 151 serve as third and fourth inputs to mixer 121, where they are combined with the primary and secondary coil signals 120 and 124, respectively to create the composite output signal 125. The composite output signal is the sum of all uncompensated external vibrating metal signals, out of balance signals, and the signals from the product or metal passing through the aperture. Further signal processing in CPU 141, using methods well known by those having ordinary skill in the art, differentiates the metal signal from the product signal. The CPU 141 sends information to display 152 and receives inputs from keyboard 153. Output signals from mechanical interlocks 154 and velocity sensors 155 are sent to the CPU 141 along signal path 156. The presence of metal as determined by CPU 141 is signalled by alarms 157. Finally, input from or outputs to other digital devices in the food processing line are accomplished through I/O port 158.

While the metal detecting circuits of the present invention have been described with respect to two specific embodiments of the invention, many modifications and improvements in the schemes depicted herein can be readily made by those having ordinary skill in the art. For example, the variable gain amplifier could be place in the primary coil circuit and the secondary coil amplifier could have a fixed gain. Alternatively, both the primary and secondary coil amplifiers could have variable gain. Also, the preferred embodiment utilizes a noninverted signal from the primary coils while the secondary coils have the signal inverted. In fact, either signal could be inverted as long as only one signal is inverted. Additionally, the preferred embodiment discloses the use of a digital signal processor to perform metal detection. The present invention can also be successfully implemented in a conventional analog system. For example, a potentiometer could be used instead of the digital to analog converter to set the variable amplifier gain. The nature of the present invention is therefore to be appreciated not merely by reference to the specified embodiments described herein, but more accurately by the scope of the claims that follow.

I claim:

1. A metal detector comprising:
   a. an electromagnetic radiator, the electromagnetic radiator being formed as a loop antenna;
   b. a first electromagnetic receiving antenna, the first electromagnetic receiving antenna being constructed so as to encompass a first volume, the first electromagnetic receiving antenna being formed as a pair of first substantially parallel loop antennas, the first volume residing between each of the first parallel loop antennas;
   c. a second electromagnetic receiving antenna, the second electromagnetic receiving antenna being constructed so as to encompass a second volume;
   d. signal amplifier circuits, the first amplifier circuit amplifying the signal from the first receiving antenna, the second amplifier circuit amplifying the signal from the second receiving antenna;
   e. signal amplifier circuits with one of the amplifier circuits inverting the signal and the amplifier circuits having variable gain differences between the first and second circuits; and
   f. a mixing circuit for combining the signals from the first amplifier circuit and the second amplifier circuit.

2. The metal detector of claim 1, wherein the second electromagnetic receiving antenna is formed as a pair of second substantially parallel loop antennas, the second volume residing between each of the second parallel loop antennas.

3. The metal detector of claim 2, wherein the first volume resides within the second volume.

4. The metal detector of claim 3, further comprising an article to be tested for metal content, the article residing within the first and second volumes.

5. The metal detector of claim 3, further comprising an inverter, the inverter being electrically connected to the second electromagnetic receiving antenna, the inverter producing an a second signal having a polarity opposite to an original polarity of the second signal.

6. The metal detector of claim 5, further comprising a mixer, the mixer being electrically interconnected to the inverter and the first receiving antenna such that the first signal is added to an inverted second signal, thereby producing a composite third signal having characteristics unique to the first signal.

7. The metal detector of claim 6, further comprising a variable gain amplifier, the variable gain amplifier being electrically interconnected between the second receiving antenna and the mixer, thereby permitting the second signal to have a peak magnitude substantially equal to a peak magnitude of the first signal.

8. The metal detector of claim 7, further comprising phase synchronous detectors, the voltage output of the detectors being sensitive to the amplitude of the input signals and the phase difference between the input signals.

9. The metal detector of claim 6, further comprising a variable gain amplifier, the variable gain amplifier being electrically interconnected between the first receiving antenna and the mixer, thereby permitting the first signal to have a peak magnitude substantially equal to a peak magnitude of the second signal.

10. A metal detector having an article processing cavity, comprising:

(a) an oscillator;

(b) a transmitting antenna, the transmitting antenna surrounding a portion of the article processing cavity, the transmitting antenna radiating an electromagnetic field at a radio frequency emanating from the oscillator;

(c) a first receiving antenna, the first receiving antenna being formed as a pair of substantially parallel loop antennas, each of the loop antennas being substantially equidistant from the transmitting antenna;

(d) a second receiving antenna, the second receiving antenna being formed as a pair of substantially parallel second loop antennas, each of the second loop antennas being substantially equidistant from the transmitting antenna and symmetrical with respect to the first receiving antenna;

(e) a conveyor, the conveyor being adapted to convey an article through the article processing cavity; and (f) a mixer, the mixer being electrically interconnected to the first and second receiving antennas, the mixer adding a signal originating from the first receiving antenna to a signal originating from the second receiving antenna, thereby producing a third composite signal wherein characteristics common to the signal originating from the first receiving antenna and the second receiving antenna are substantially attenuated.

11. The metal detector of claim 10, wherein the transmitting antenna is formed as a loop antenna, the loop antenna residing substantially within a first plane.

12. The metal detector of claim 11, wherein each of the loop antennas of the first and second receiving antennas reside substantially within separate planes, each of the separate planes being substantially parallel to the first plane.

13. The metal detector of claim 12, further comprising a signal processor, the signal processor being electrically connected to the signal originating from the first receiving antenna and the signal originating from the second receiving antenna such that characteristics unique to the signal originating from the first receiving antenna can be distinguished from characteristics unique to the signal originating from the second receiving antenna.

14. A method of detecting metal in an article while minimizing the effect of nearby metal objects not residing within the article, comprising the steps of:

(a) creating an electromagnetic field;

(b) passing the article near a first receiving antenna so as to produce a first signal;

(c) passing the article near a second receiving antenna so as to produce a second signal;

(d) identifying at least some components of the second signal that are also present in the first signal;

(e) creating a composite third signal in which at least some components common to both the first and second signal are attenuated;

(f) synchronously detecting the composite third signal to remove asynchronous noise from external and internal noise sources; and (g) removing continuous wave components of the third composite signal so as to leave only an amplitude modulated waveform envelope created by metal residing within the electromagnetic field.

* * * * *